(12) United States Patent
Hirano et al.

(10) Patent No.: US 7,382,583 B2
(45) Date of Patent: *Jun. 3, 2008

(54) ROTARY PIEZOELECTRIC MICROACTUATOR AND DISK DRIVE HEAD-SUSPENSION ASSEMBLY

(75) Inventors: Toshiki Hirano, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 419 days.

This patent is subject to a terminal disclaimer.

(21) Appl. No.: 10/928,296

(22) Filed: Aug. 26, 2004

(65) Prior Publication Data

US 2006/0044699 A1 Mar. 2, 2006

(51) Int. Cl.
*G11B 5/56* (2006.01)

(52) U.S. Cl. .............................. 360/294.4; 360/234.4; 360/234.6

(58) Field of Classification Search .............. 360/294.4, 360/294.6, 294.3, 294.1, 234.6, 234.4
See application file for complete search history.

(56) References Cited

U.S. PATENT DOCUMENTS

| | | | |
|---|---|---|---|
| 5,959,808 A | 9/1999 | Fan et al. | |
| 5,995,334 A * | 11/1999 | Fan et al. ............... | 360/294.3 |
| 6,195,227 B1 * | 2/2001 | Fan et al. ............... | 360/294.3 |
| 6,381,104 B1 | 4/2002 | Soeno et al. | |
| 6,538,854 B2 * | 3/2003 | Koganezawa et al. ... | 360/294.4 |
| 6,721,136 B2 * | 4/2004 | Kurihara et al. ......... | 360/294.4 |
| 6,754,047 B2 * | 6/2004 | Pan et al. ............... | 360/294.4 |
| 6,853,517 B2 * | 2/2005 | Hirano et al. ........... | 360/294.3 |
| 6,961,221 B1 * | 11/2005 | Niu et al. ............... | 360/294.4 |
| 7,035,056 B2 * | 4/2006 | Franken et al. .......... | 360/294.4 |
| 2002/0048124 A1 * | 4/2002 | Kuwajima et al. ....... | 360/294.4 |
| 2003/0133230 A1 * | 7/2003 | Hida et al. .............. | 360/294.4 |
| 2006/0044698 A1 * | 3/2006 | Hirano et al. ........... | 360/294.4 |

* cited by examiner

*Primary Examiner*—Brian E. Miller
*Assistant Examiner*—Matthew G. Kayrish
(74) *Attorney, Agent, or Firm*—Thomas R. Berthold

(57) ABSTRACT

The invention is a moving-slider rotary piezoelectric microactuator as the secondary actuator for a dual-stage actuator disk drive. The microactuator has a substrate attached to the disk drive suspension and a rotatable frame that supports the slider, so the head-suspension assembly includes the suspension, the microactuator and the slider with attached read/write head. The rotatable frame is attached to a fixed post on the substrate by relatively stiff torsional springs. A piezoelectric driver having a fixed end attached to the substrate provides bidirectional linear displacement of its movable end. The microactuator has a displacement amplification mechanism that includes a connecting rod and a linkage that translates the linear displacement of the driver to amplified orthogonal linear displacement of the rod. The connecting rod is attached to the rotatable frame at a radial distance to cause rotary movement of the frame, and thereby cross-track displacement of the read/write head on the slider.

8 Claims, 7 Drawing Sheets

ROTARY PIEZOELECTRIC MICROACTUATOR AND DISK DRIVE HEAD-SUSPENSION ASSEMBLY

RELATED APPLICATION

This application is related to concurrently filed application 10/927,926 filed Aug. 26, 2004 and titled "DISK DRIVE WITH ROTARY PIEZOELECTRIC MICROACTUATOR".

BACKGROUND OF THE INVENTION

1. Field of the Invention

The invention relates generally to piezoelectric microactuators for data recording disk drives with dual-stage actuators, and more particularly to moving-slider type piezoelectric microactuators.

2. Description of the Related Art

Data recording disk drives, such as magnetic recording disk drives, store information in data tracks on the data surface of a rotatable magnetic recording disk. A read/write head or transducer that reads data from and writes data to the data surface is located on an air-bearing slider that is supported by a cushion of air on the rotating disk. The slider is attached to a flexible suspension at the end of a rigid arm and is moved generally radially from track to track by an actuator. The disk drive actuator is typically a rotary voice coil motor (VCM) that moves the actuator arm and the attached suspension and slider generally radially to position the head at the desired track under the control of a servo control system that receives pre-recorded servo position information from the data surface. As the data tracks on the disk are made narrower and placed closer together to increase the data density, it becomes increasingly difficult for the actuator and the servo control system to quickly and accurately position the head over the desired track and to provide track following. For example, a servo control system with a VCM actuator will have difficulty achieving a servo loop bandwidth greater than 2 kHz.

One way to improve the servo bandwidth is with a dual-stage actuator, where a VCM actuator is a first stage that provides coarse positioning of the head and a secondary actuator is a second stage that provides fine positioning of the head. The secondary actuator can be a moving-slider type of actuator that is located between the end of the suspension and the slider and moves the slider relative to the suspension. One such moving-slider type of secondary actuator is a rotary electrostatic microactuator (so called because it is a micro-electromechanical system (MEMS) device), as described in U.S. Pat. Nos. 5,959,808 and 5,995,334. Advances in integrated circuit technology in recent years have led to the development of MEMS devices of micrometer dimensions that can be actuated and controlled using electrostatic and other methods, such as mechanical, electromagnetic, fluidic and thermal. MEMS manufacturing technologies are a combination of the more established semiconductor micro-fabrication techniques with newer developments in micromachining.

Because the moving-slider microactuator is electrostaticly driven it generally applies a relatively small force to provide a relatively large displacement of the slider, and thus typically uses relatively soft springs to support the movable slider. However, in some disk drive applications the external disturbance forces, such as may occur from air flow and head-disk contact, can be relatively large, which results in an increased level of head position error.

Moving-slider microactuators that use piezoelectric drivers have been proposed. These microactuators typically require the piezoelectric element to be located near the end of the slider that supports the head, such that a large external force can damage the piezoelectric element. Also, these microactuators typically move the slider in translation, i.e. in a linear direction, such that the counter-force can excite the natural vibration modes of the suspension, which limits the achievable servo bandwidth of the dual-stage actuator. Because piezoelectric microactuators also require a larger force but provide less displacement than comparable electrostatic microactuators, they may not provide adequate displacement to maintain the head centered on the data track. U.S. Pat. No. 6,381,104 shows a piezoelectric moving-slider microactuator that moves the slider by rotation, but the rotatable portion is not supported at its axis of rotation, there are no torsional springs to assure pure rotary motion, the displacement of the head is generally the same as the displacement of the piezoelectric element, and the piezoelectric elements are located near the end of the slider that is most likely to contact the disk.

What is needed is a piezoelectric moving-slider rotary microactuator as the secondary actuator for a dual-stage-actuator disk drive that is substantially resistant to external forces, provides substantially pure rotary motion, and amplifies the displacement of the piezoelectric driver.

SUMMARY OF THE INVENTION

The invention is a moving-slider rotary piezoelectric microactuator as the secondary actuator for a dual-stage actuator disk drive. The microactuator has a substrate attached to the disk drive suspension and a rotatable frame that supports the slider, so the head-suspension assembly includes the suspension, the microactuator and the slider with attached read/write head. The rotatable frame is attached to a fixed post on the substrate by relatively stiff torsional springs. A piezoelectric driver having a fixed end attached to the substrate provides bidirectional linear displacement of its movable end. The microactuator includes a displacement amplification mechanism. In one embodiment an arm or connecting rod is located between the driver's movable end and the frame. A linkage between the movable end of the driver and a first end of the connecting rod translates the linear displacement of the driver to amplified orthogonal linear displacement of the rod. The second end of the rod is attached to the rotatable frame at a radial distance to cause rotary movement of the frame, and thereby cross-track displacement of the read/write head on the slider. The piezoelectric driver generates a large enough force that the torsional springs can be made stiff enough to resist external disturbance forces, yet the relatively small driver displacement is made adequate by the use of the displacement amplification mechanism.

For a fuller understanding of the nature and advantages of the present invention, reference should be made to the following detailed description taken together with the accompanying figures.

DETAILED DESCRIPTION OF THE INVENTION

Prior Art

The invention will be described for a magnetic recording disk drive with a magnetic read/write head that reads and writes data to the magnetic recording disk. However, the invention is applicable to any disk drive and any head that communicates data with the disk. Thus the disk drive may use an optical disk, or may have a head that only reads data or only writes data.

Figure 1:
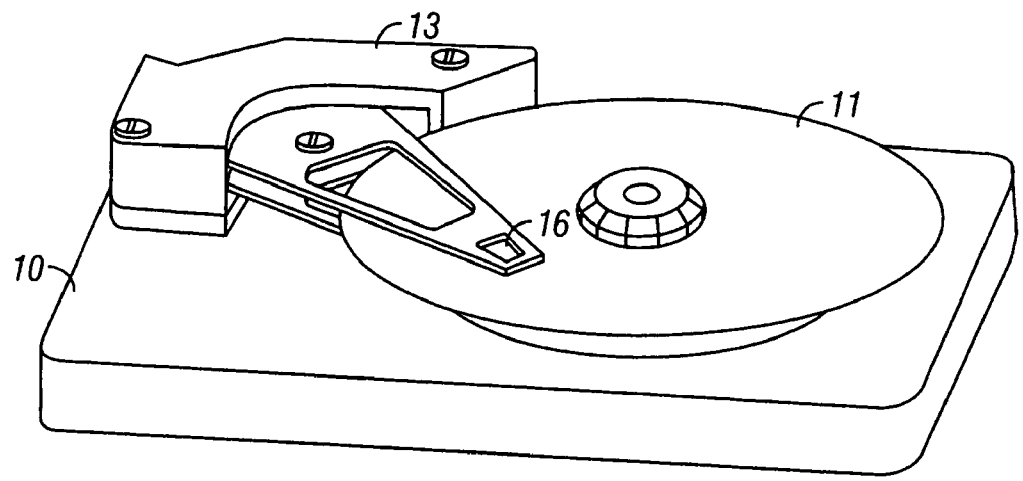
FIG. 1 is a perspective view of a prior art disk drive with a two-stage head positioning system.
Figure 2:
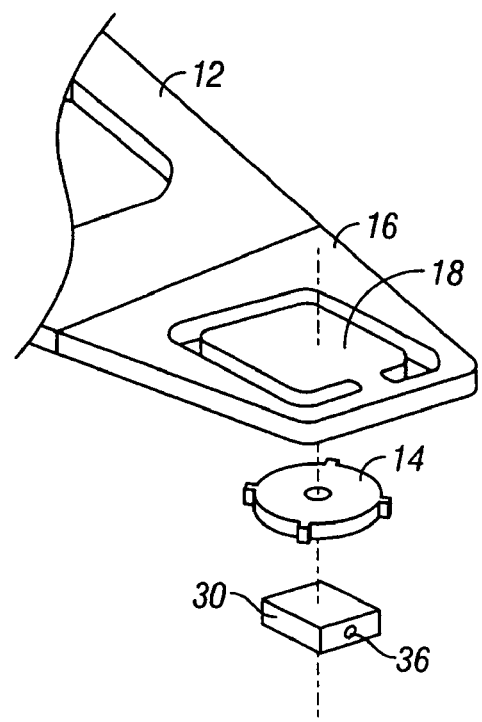
FIG. 2 is a view of the rotary secondary actuator attached to the suspension of the prior art disk drive of FIG. 1.

In FIGS. 1 and 2, the disk drive is a magnetic recording disk drive that has a two-stage actuator and servo system for positioning a magnetic read/write head 36 attached to a head carrier or slider 30, which may be an air-bearing slider or a contact recording slider, over a selected track on a magnetic recording disk 11. The two-stage servo system includes a voice-coil motor (VCM) primary actuator 13 for coarse positioning the head. The primary actuator 13 and rotatable disk 11 are mounted to the disk drive base 10. The primary actuator 13 includes an actuator arm 12 that has a suspension 16 on its end. The slider 30 is attached to the flexible gimbal 18 of suspension 16. The secondary actuator for fine positioning the head 36 over the selected track is a moving-slider type of microactuator 14 attached to the gimbal 18. The microactuator 14 supports the slider 30. The enlarged exploded view of FIG. 2 shows the microactuator 14, in the form of an electrostatic rotary microactuator, positioned between the gimbal 18 and slider 30. The fixed part of the microactuator 14 is bonded to the bottom of gimbal 18 and the slider 30 is bonded to the movable part of the microactuator 14, so the head-suspension assembly includes the gimbal 18, the microactuator 14 and the slider 30. A bonding platform (not shown) may be mounted between the microactuator 14 and the slider 30. The slider 30 may be a continuous contact type of head carrier, such as those having pads or skids that remain in contact with the disk during reading and writing. The slider 30 may also be either the non-contact type that provides a full air-bearing support, or a type that provides only partial support with a portion of the slider being in contact or near-contact with the disk during reading and writing.

Figure 3:
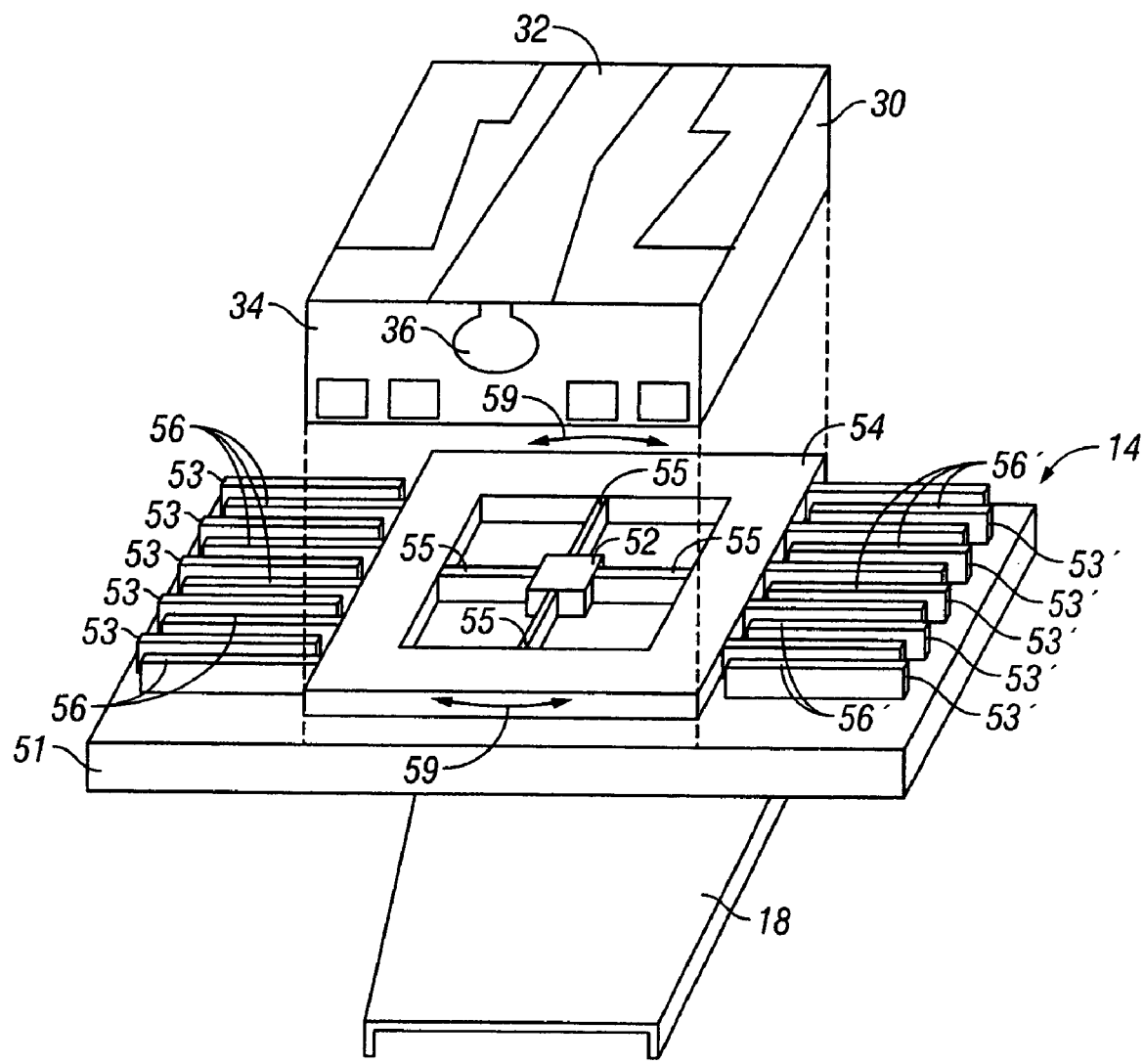
FIG. 3 is an exploded perspective view of a prior art rotary electrostatic microactuator with suspension and slider.

FIG. 3 is an exploded view of a type of prior art head-suspension assembly with a rotary electrostatic microactuator 14, the disk drive suspension gimbal 18, and the air-bearing slider 30. The slider 30 has an air-bearing surface 32 that faces the disk of the disk drive and a trailing surface 34 that supports the read/write head 36. The microactuator 14 comprises fixed and movable portions on an insulating substrate 51, which is typically a silicon base with an insulating surface layer, such as a layer of polyimide, silicon oxide or silicon nitride. The substrate 51 is mounted to the gimbal 18 on the end of the suspension 16 (FIG. 2). The fixed portion of the microactuator 14 includes central post 52 fixed to substrate 51 and two sets of stationary electrodes 53, 53' also fixed to substrate 51. The movable rotary portion of the microactuator 14 includes a support frame 54, a plurality of flexures or torsional springs 55 connecting the frame 54 to the fixed post 52, and a plurality of movable electrodes depicted as two sets 56, 56' attached to frame 54. The sets of movable electrodes 56, 56' are interleaved with the sets of fixed electrodes 53, 53', respectively. The frame 54 may optionally support a bonding platform (not shown) to which the slider 30 is bonded. When an electric potential is applied between the fixed and movable electrodes, the frame 54 experiences rotary motion around the central axis of post 52, as shown by arrow 59, which moves the head 36 in cross-track directions. All of the elements attached to the substrate 51 are formed by lithographically patterning the substrate 51 and depositing electrically conductive material, such as nickel (Ni) or copper (Cu).

The Invention

Figure 4:
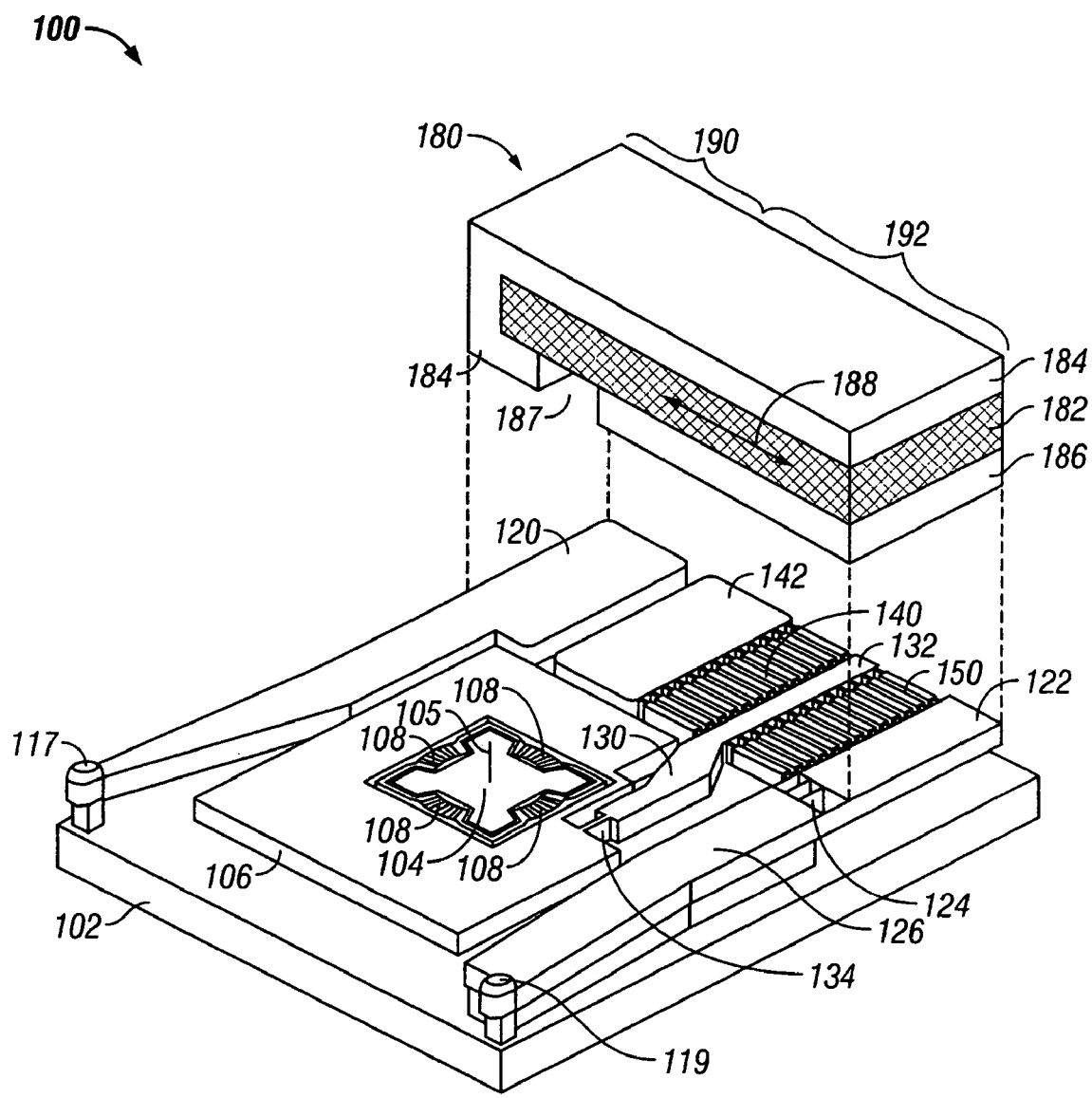
FIG. 4 is an exploded perspective view of the rotary piezoelectric microactuator of this invention with no head carrier.

FIG. 4 is a perspective view of the rotary piezoelectric microactuator 100 of this invention. The microactuator 100 includes a substrate 102 and is depicted with no head carrier or slider attached and with the piezoelectric driver 180 raised above the substrate for ease of illustration of the microactuator components. The substrate may be single-crystal silicon (Si) or other suitable material. All of the microactuator elements depicted in FIG. 4, with the exception of piezoelectric driver 180, are patterned on the substrate and formed of electrically conductive material, preferably Ni. The movable elements are raised above the substrate 102 and are connected to fixed elements attached to the substrate. The microactuator elements on substrate 100 are formed using well-known MEMS microfabrication techniques. Generally, the substrate 102 is first lithographically patterned, after which a material such as silicon dioxide ($SiO_2$) is deposited on the substrate regions that will be located below the movable elements. The substrate is then patterned with photoresist and Ni is electroplated to form all of the elements, including the fixed elements attached to the substrate. The photoresist and underlying $SiO_2$ are removed to form the resulting microactuator elements on substrate 102.

A post 104 centered about an axis 105 is fixed to substrate 102. A rotatable frame 106 is raised above substrate 102 and is connected to fixed post 104 by a plurality of flexures 108 that extend generally radially outward from axis 105. The post flexures 108 function like torsional springs during rotary movement of frame 106. The head carrier or slider is attached to the frame 106, preferably with its center of mass aligned with axis 105, and the substrate is attached to the disk drive suspension, in the manner similar to that shown in FIG. 3, to form the head-suspension assembly.

The piezoelectric driver 180 is a sheet 182 of piezoelectric material with an electrically conductive layer as first electrode 184 and an electrically conductive layer as second electrode 186. The two electrodes 184, 186 are electrically isolated from one another, as shown by gap 187. The piezoelectric driver 180 expands and contracts generally linearly along its length, i.e., in the plane of piezoelectric sheet 182, as depicted by arrow 188, when a voltage is applied across the electrodes 184, 186. The sheet 180 can be any of the well-known piezoelectric materials, such as the polycrystalline ferroelectric ceramic materials, e.g., barium titanate (BaTiO$_3$) and lead-zirconate-titanate (PZT). Piezoelectric ceramic materials include NEPEC® NPM ceramics available from NEC/Tokin. The piezoelectric driver 180 can also be a multilayer PZT actuator, such as an actuator made by Noliac A/S of Denmark. A multilayer PZT actuator can reduce the required driving voltage for the same displacement output.

The fixed portion 190 of piezoelectric driver 180 is attached to plate 120 on substrate 102. Electrical connection is made to first electrode 184 from a conductive pad 117 through plate 120. The movable portion 192 of piezoelectric driver 180 is attached to movable plate 122. The movable plate 122 is connected by flexures 124 to an anchor 126 that is fixed to substrate 102. Electrical connection is made to second electrode 186 from a conductive pad 119 through anchor 126 and flexures 124 to plate 122. The anchor flexures 124 permit the generally linear bidirectional displacement of movable portion 192 shown by arrow 188 while providing stiffness to prevent movement orthogonal to this displacement. The piezoelectric driver portions 190, 192 can be attached to respective plates 120, 122 by electrically conductive epoxy.

A connecting rod or arm 130 connects the driver movable portion 192 to rotatable frame 106. The first end 132 of arm 106 is located between a plurality of flexures 140 and a plurality of linkages 150. The flexures 140 are connected at their fixed ends to a fixed plate 142 that is attached to substrate 102. The other ends of flexures 140 are attached to arm end 132. The linkages interconnect arm end 132 and movable plate 122. Thus the flexures 140, arm 130 with arm end 132, linkages 150 and plate 122 are all raised above substrate 102 and are connected to driver movable portion 192. The second end 134 of arm 130 is connected to frame 106 at some radial distance from axis 105.

Figure 5:
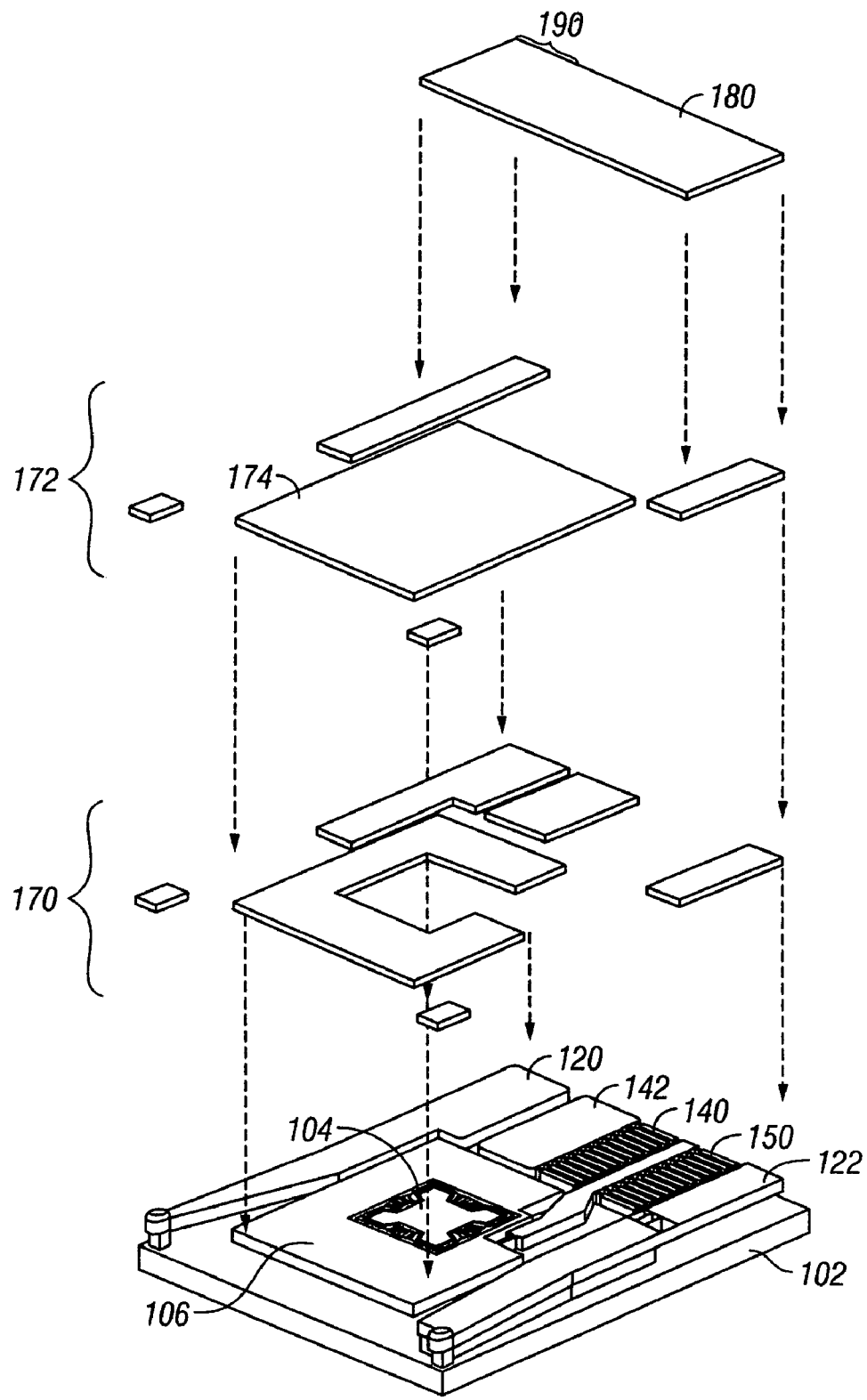
FIG. 5 is an exploded view illustrating the assembly of the microactuator of this invention.

FIG. 5 is an exploded view illustrating the assembly of the microactuator. A spacer layer 170 is patterned as shown and deposited on the underlying microactuator elements formed on the substrate 102. A cover layer 172, including bonding pad 174, is patterned on top of the spacer layer 170. The purpose of the spacer layer 170 is to assure that the movable elements on substrate 102 and the movable elements formed later do not interfere with each other or with fixed elements. For example, the spacer layer directly beneath bonding pad 174 prevents the bonding pad from contacting post 104 and the spacer layer directly beneath fixed end 192 of piezoelectric driver 180 prevents the driver 180 from contacting flexures 140, 150.

The operation of the microactuator 100 will be explained with FIG. 6, which is a top view with the piezoelectric driver 180 removed. When the piezoelectric driver 180 is activated by the application of voltage, the plate 122 to which the driver movable portion 192 (FIG. 4) is attached is displaced linearly (along arrow 188). Because the arm end 132 can not move along arrow 188 due to the stiffness of flexures 140 in the direction of arrow 188, this linear displacement of plate 122 is translated to arm 130 by linkages 150, causing linear displacement of arm 130 (along arrow 136) substantially orthogonal to the linear displacement of plate 122. The linkages 150 are oriented at a small angle away from a line parallel to arrow 188 toward the arm end 132. This angle and the length of linkages 150 are chosen to amplify the displacement of driver movable portion 192.

The displacement amplification can be considered in an example. For most disk drive applications, an amplification of between approximately 2 and 15 is believed acceptable. If the head carrier is a commercially available "pico-slider", then the frame 106 to support it will have dimensions of approximately 1.25 mm by 1 mm. If the displacement amplification is approximately 10, then if the piezoelectric driver 180 has a bidirectional displacement of +/−0.1 microns, the end 132 of arm 130 will have a displacement of approximately +/−1.0 microns. The cross-track displacement of the head on the pico-slider can be further amplified by the length of the radius between the axis 105 and the arm end 132. If the head is located at twice the radius of arm end 132, then the head cross-track displacement will be approximately +/−2.0 microns.

Figure 6:
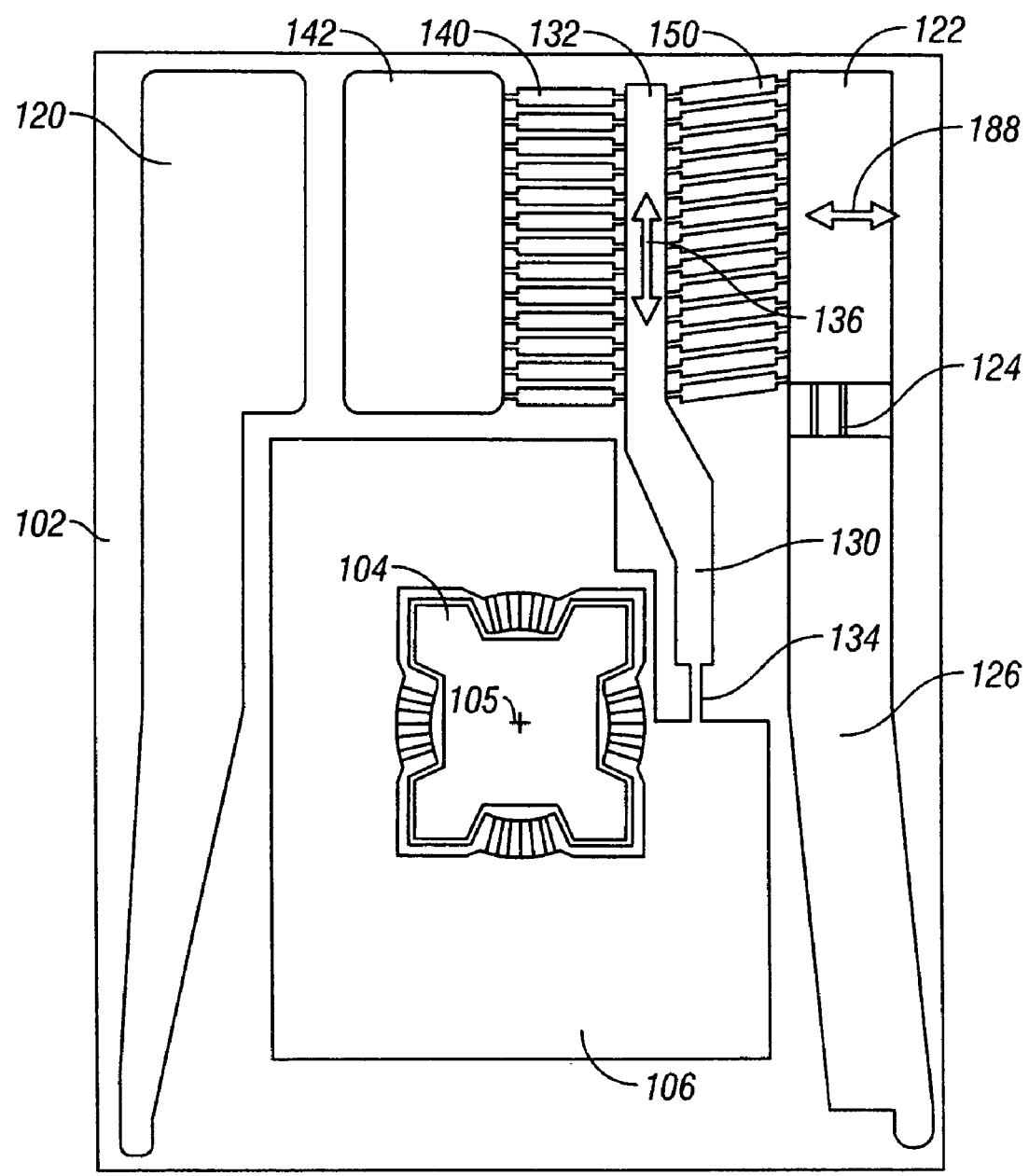
FIG. 6 is a top view of the rotary piezoelectric microactuator of this invention with the piezoelectric driver and head carrier removed.

FIG. 6 illustrates a shock-resistant feature of the microactuator 100. The anchor flexures 124 have stiffness along their lengths to provide resistance against external forces acting on driver movable portion 192 in a direction generally orthogonal to arrow 188. Similarly, the driver flexures 140 also have stiffness along their lengths but provide resistance against external forces acting on driver movable portion 192 in a direction generally along arrow 188. Thus the movable portion of piezoelectric driver 180 is substantially resistant to any in-plane external disturbance forces. When a large shock is applied to the microactuator and slider assembly, the largest force is generated by the mass of the slider. In a disk drive, the shock typically generates a large linear acceleration. Thus, the slider mass creates a large linear force that is applied to the slider frame 106. However, the frame 106 is supported by the relatively stiff flexures 108 so shock is not transmitted to the ceramic piezoelectric sheet 182, which is relatively brittle.

Figure 7:
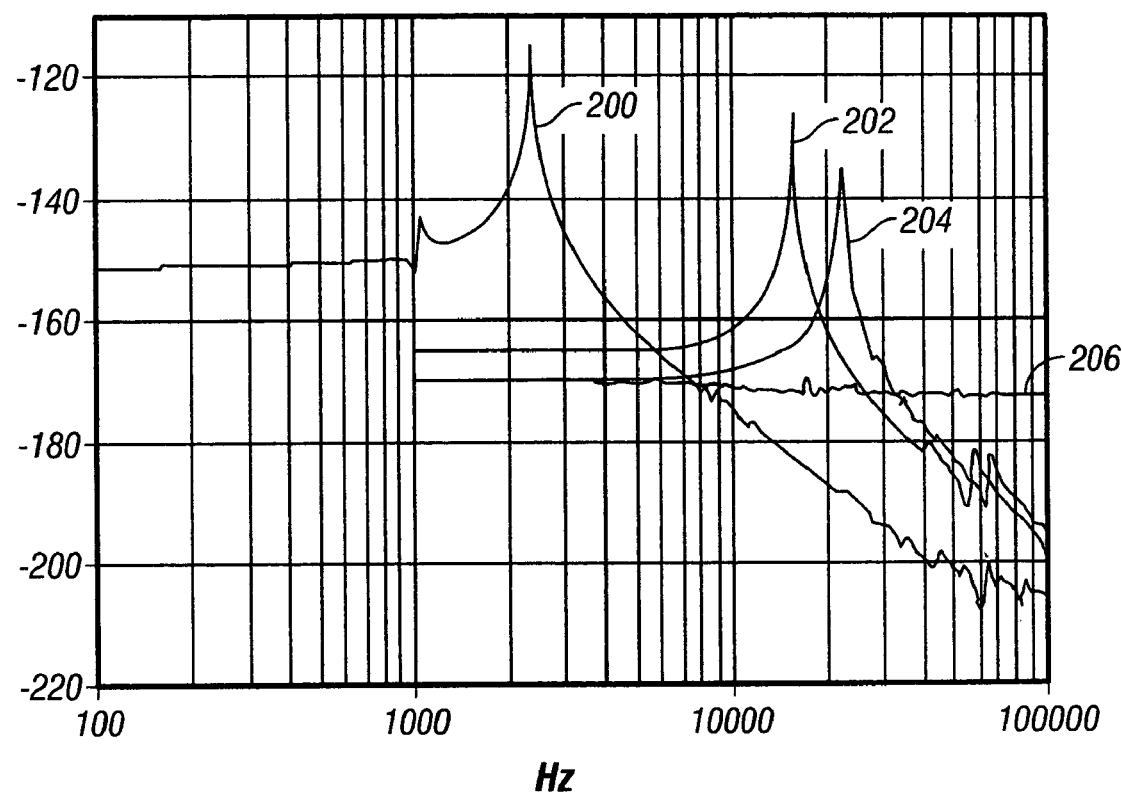
FIG. 7 are the gain portions of open-loop frequency responses for a prior art rotary electrostatic microactuator, two rotary piezoelectric microactuators according to this invention, and a piezoelectric driver portion of a rotary piezoelectric microactuator of this invention.

FIG. 7 shows the gain of open-loop frequency responses for three microactuators and the piezoelectric driver of a rotary piezoelectric microactuator. Line 200 is the frequency response of the prior art rotary electrostatic microactuator, as depicted in FIG. 3. It has a relatively low resonant frequency (about 2.5 kHz) because of the requirement that the torsional springs be relatively soft to accommodate the relatively low electrostatic force. Line 202 is the frequency response of a rotary piezoelectric microactuator of this invention and of a comparable size to that of the prior art electrostatic microactuator, wherein the torsional springs have a spring constant approximately 20 times higher than the prior art electrostatic microactuator. This microactuator has a resonant frequency of about 17 kHz. Line 204 is the frequency response of a rotary piezoelectric microactuator of this invention and of a comparable size to that of the prior art electrostatic microactuator, wherein the torsional springs have a spring constant approximately 40 times higher than the prior art electrostatic microactuator. This microactuator has a resonant frequency of about 22 kHz. The torsional spring constant can be significantly higher for the rotary piezoelectric microactuator because the piezoelectric force is substantially higher than the electrostatic force. The torsional spring constants are chosen by selection of the number, length, and thickness of the radial flexures (flexures 55 in FIG. 3 and flexures 108 in FIG. 4) that connect the rotatable frame to the post. Line 206 is the frequency response of just the piezoelectric driver and shows that there are no vibration modes in the frequency range of interest.

Figure 8:
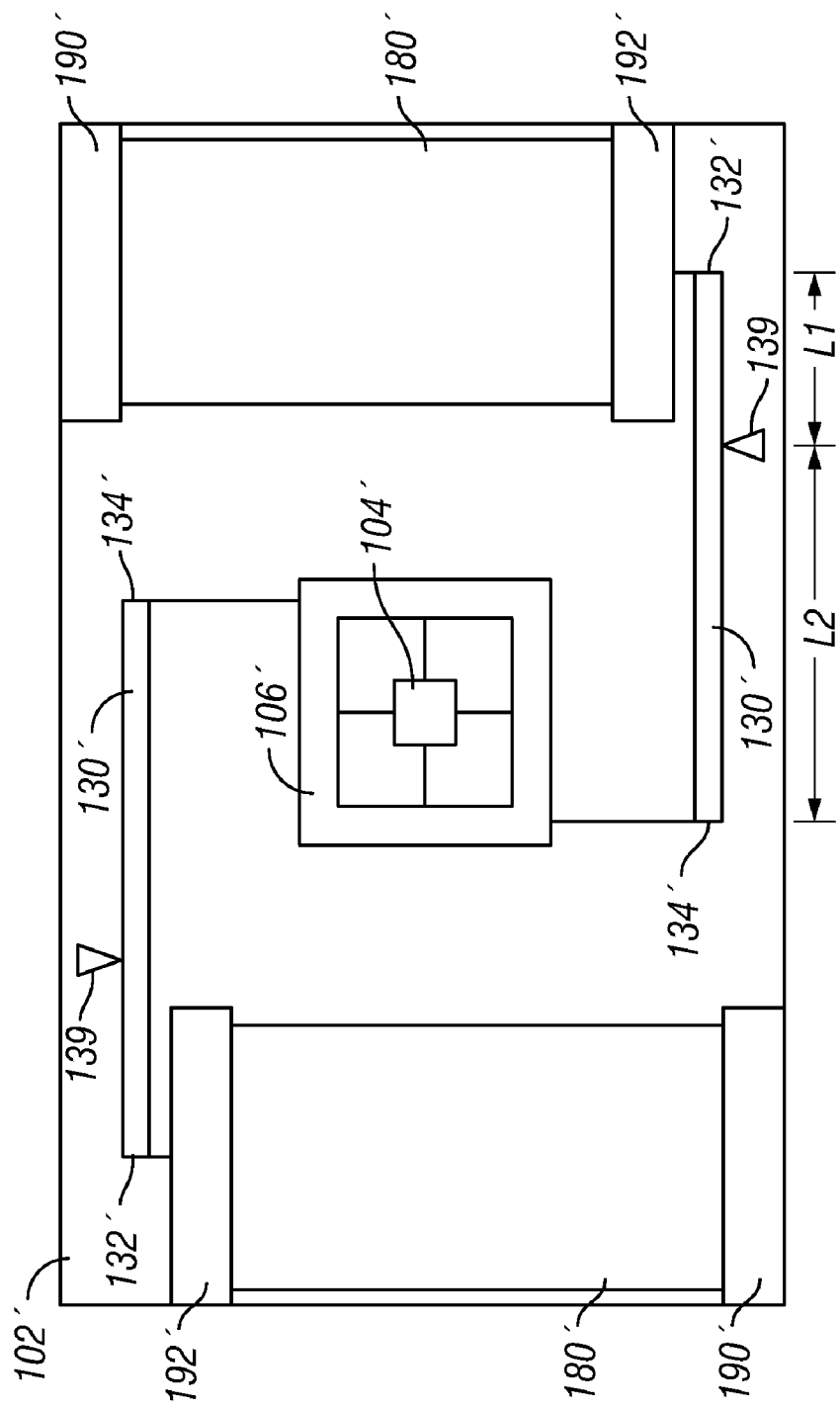
FIG. 8 is a schematic of a second embodiment of a rotary piezoelectric microactuator with displacement amplification according to this invention.

FIG. 8 is a schematic of a second embodiment of a rotary piezoelectric microactuator with displacement amplification. In this embodiment at least one piezoelectric driver 180' has an arm 130' attached to its movable portion 192'. The first end 132' of arm 130' is attached to the driver movable portion 192' and the second end 134' is attached to the rotatable frame 106'. A fulcrum 139 is attached to substrate 102' and contacts the arm 130' at a distance L1 from end 132 and a distance L2 from end 134. The arm 130' thus acts as a lever to amplify the displacement of piezoelectric driver 180', with the amplification being given approximately by L2/L1.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A rotary piezoelectric microactuator comprising:
   a substrate;
   a post fixed to the substrate;
   a rotatable frame connected to the post by a plurality of post flexures, the post flexures permitting rotary movement of the frame about an axis through the post;
   a single piezoelectric driver having a portion fixed to the substrate and a movable portion having bidirectional linear displacement along a first line;
   a connecting rod having its length oriented generally orthogonal to said first line and having a driver end connected to the driver movable portion and a frame end connected to the rotatable frame at a radius from the axis of the post;
   a linkage connecting the driver movable portion to the driver end of the rod and causing the driver end of the rod to move in a generally linear direction substantially orthogonal to said first line, the linkage amplifying the displacement of driver movable portion, whereby the frame end of the rod exhibits a generally linear displacement greater than the generally linear displacement of the movable portion of the driver in response to movement of the movable portion of the driver;
   an anchor fixed to the substrate and connected to the movable portion of the driver by an anchor flexure, the anchor flexure permitting the generally linear movement of the movable portion of the driver along said first line and preventing movement generally orthogonal to said first line; and
   a driver flexure connecting the driver fixed portion to the driver end of the rod, the driver flexure substantially preventing movement of the driver end of the rod along said first line.

2. The microactuator of claim 1 wherein the anchor and anchor flexure are formed of electrically conductive material.

3. The microactuator of claim 1 wherein the radius from the axis of the post to the frame end of the rod is generally orthogonal to the generally linear displacement of the frame end of the rod.

4. The microactuator of claim 1 wherein the linear displacement of the second end of the rod is between approximately 2 and 15 times greater than the linear displacement of the movable portion of the driver.

5. The microactuator of claim 1 further comprising a magnetic recording disk drive head suspension, and wherein the substrate is attached to the suspension.

6. The microactuator of claim 1 further comprising a magnetic recording disk drive air-bearing slider, and wherein the slider is attached to the rotatable frame.

7. A magnetic recording head-suspension assembly comprising:
   a magnetic recording disk drive suspension;
   a magnetic recording disk drive head carrier, the carrier supporting a magnetic recording read/write head;
   a piezoelectric microactuator comprising:
      a substrate attached to the suspension;
      a post fixed to the substrate;
      a rotatable frame connected to the post by a plurality of torsional springs, the springs permitting rotary movement of the frame about an axis through the post, wherein the head carrier is attached to the rotatable frame;
      a piezoelectric driver having a portion fixed to the substrate and a movable portion having bidirectional linear displacement;
      a lever arm having its length aligned generally orthogonal to the linear displacement of the driver and having a driver end connected to the driver movable portion and a frame end connected to the rotatable frame at a radius from the axis of the post; and
      a fulcrum attached to the substrate and spaced from the post and contacting the lever arm at a distance L1 from the driver end and a distance L2 from the frame end, wherein L2 is greater than L1, whereby when the driver displaces the driver end of the lever arm the frame end of the lever arm exhibits a generally greater linear displacement.

8. The assembly of claim 7 further comprising a bonding platform attached to the rotatable frame, the head carrier being mounted to the bonding platform.

* * * * *